United States Patent
Tagawa

[11] Patent Number: 5,920,449
[45] Date of Patent: Jul. 6, 1999

[54] RECORDING HEAD FOR SINGLE LAYER MAGNETIC FILM PERPENDICULAR MAGNETIZATION MEDIUM

[75] Inventor: Ikuya Tagawa, Kawasaki, Japan

[73] Assignee: Fujitsu Limited, Kawasaki, Japan

[21] Appl. No.: 08/901,015

[22] Filed: Jul. 25, 1997

[30] Foreign Application Priority Data

Feb. 24, 1997 [JP] Japan ................................. 9-039552

[51] Int. Cl.⁶ ................................................ G11B 5/187
[52] U.S. Cl. ........................ 360/122; 360/125; 360/135
[58] Field of Search ........................... 360/119–126, 135

[56] References Cited

U.S. PATENT DOCUMENTS

| | | | |
|---|---|---|---|
| 4,745,506 | 5/1988 | Nakamura et al. | 360/123 |
| 4,974,110 | 11/1990 | Kanamine et al. | 360/126 |
| 5,083,365 | 1/1992 | Matsumoto | 360/122 |
| 5,267,112 | 11/1993 | Batra et al. | 360/119 |
| 5,296,993 | 3/1994 | Aboaf et al. | 360/126 |
| 5,452,166 | 9/1995 | Aylwin et al. | 360/126 |
| 5,659,446 | 8/1997 | Tanaka et al. | 360/125 |
| 5,726,841 | 3/1998 | Tong et al. | 360/122 |
| 5,729,412 | 3/1998 | Uemura et al. | 360/122 |

FOREIGN PATENT DOCUMENTS

| | | |
|---|---|---|
| 63-308717 | 12/1988 | Japan . |
| 137703 | 2/1989 | Japan . |
| 1151011 | 6/1989 | Japan . |
| 490101 | 3/1992 | Japan . |

*Primary Examiner*—Jefferson Evans
*Attorney, Agent, or Firm*—Greer, Burns & Crain Ltd.

[57] ABSTRACT

A recording head for a magnetic medium having a single layer magnetic film having an axis of easy magnetization in a direction inclined from an in-plane direction of the magnetic medium includes a leading pole provided on the upstream side in a direction of movement of the medium, and a trailing pole having an end cooperating with the end of the leading pole to define a small gap therebetween and a rear end portion held in contact with the leading pole. The trailing pole is provided on the downstream side in the direction of movement of the medium. The recording head further includes a coil wound around the contacting portions of the leading pole and the trailing pole. The distance between the end of the trailing pole and the medium is set larger by more than a predetermined length than the distance between the end of the leading pole and the medium.

9 Claims, 16 Drawing Sheets

RECORDING HEAD FOR SINGLE LAYER MAGNETIC FILM PERPENDICULAR MAGNETIZATION MEDIUM

BACKGROUND OF THE INVENTION

1. Field of the Invention

This invention relates to a recording head for a perpendicular magnetization medium having a single layer magnetic film.

2. Description of the Related Art

In recent years, as reduction in size and increase in capacity of a magnetic disk drive proceeds, refinement of magnetic particles in a medium is demanded. However, in a conventional recording system called an in-plane recording system, remarkable refinement of magnetic particles is difficult because it results a factor of thermal instability. Therefore, a perpendicular magnetization recording system which is superior in thermo-magnetic relaxation and so forth is examined. In an ordinary perpendicular magnetic recording system, a two-layer film medium wherein a soft magnetic ground layer is layered on a substrate and a perpendicular magnetization film is layered on the soft magnetic ground layer is used.

However, since reduction of magnetic noise is difficult with a two-layer film medium, another perpendicular magnetic recording system which employs a single layer magnetic film medium wherein a perpendicular magnetization film is layered or laminated on a substrate directly or with an insulation film interposed therebetween has been investigated recently. However, where a single layer perpendicular magnetization film which does not have a soft magnetic ground layer on a substrate is used as a recording medium, it is essentially required to develop a recording head (writing head) having a steep magnetic field gradient.

In a conventional perpendicular recording system which employs a single layer magnetic film medium, an ordinary ring head for the in-plane recording system, that is, a metal-in-gap (MIG) ring head or a thin film ring head whose leading pole and trailing pole have an equal height as viewed from the plane of the medium, is used. A general structure of a conventional thin film ring head will now be described with reference to FIGS. 1 and 2. A conventional head slider 2 has a pair of floating rails 4 and 6, and a thin film ring head 8 is formed at a downstream side end portion 2a of the head slider 2 at which the floating rail 4 is located in a direction of movement of a magnetic disk medium indicated by an arrow mark P.

Referring to FIG. 2, an enlarged sectional view of the thin film ring head 8 is shown together with a single layer magnetic film medium 10. The single layer magnetic film medium 10 includes a non-magnetic substrate 12, and a perpendicular magnetization film 14 made of, for example, Co-Cr and layered on the non-magnetic substrate 12. A non-magnetic substrate 16 of the thin film ring head 8 forms part of the head slider 2 and is formed from, for example, Al$_2$O$_3$ TiC. A leading pole 18 formed from a magnetic thin film of a permalloy (Ni-Fe) or a like material is formed on the non-magnetic substrate 16.

Reference 20 denotes a trailing pole formed similarly from a magnetic thin film of a permalloy or a like material, and a small gap 22 is defined between an end 18a of the leading pole 18 and an end 20a of the trailing pole 20 which oppose to the medium 10. A rear end portion 18b of the leading pole 18 and a rear end portion 20b of the trailing pole 20 are held in contact with each other over a predetermined length, and generally a ring structure is defined by the trailing pole 20 and the leading pole 18. The length of the small gap 22 is approximately 0.5 μm.

A spiral thin film coil 24 made of copper (Cu) is provided around the contacting portions of the leading pole 18 and the trailing pole 20. The leading pole 18, trailing pole 20 and thin film coil 24 are embedded in a insulation layer 26. FIG. 3 shows an enlarged view of a portion in the proximity of the end portion of the conventional ring head 8. In the perpendicular magnetic recording system, the axis of easy magnetization of the medium is in a direction perpendicular to the plane of the medium film, and consequently, a magnetic field component in a perpendicular direction of a magnetic vector (head magnetic field) produced in the medium by the magnetic head is used to write data onto the recording medium.

The perpendicular magnetic field component Hz of the conventional ring head 8 has a point symmetrical distribution centered at the small gap 22 as seen in FIG. 4 and has two peaks of the different signs in the proximity of an edge of the leading pole 18 facing the small gap 22 and in the proximity of an edge of the trailing pole 20 facing the small gap 22. Therefore, although the medium is magnetized (recorded) once by the peak magnetic field on the leading pole 18 side, it is re-written substantially completely by the peak magnetic field on the trailing pole 20 side.

Accordingly, magnetization transition is formed by a magnetic field gradient at a portion A adjacent the trailing side (on the side from which the medium goes away) with respect to the peak magnetic field which appears in the proximity of the edge of the trailing pole 20 which faces the small gap 22. However, since the magnetic field gradient at this portion is very moderate, it is difficult to form a steep magnetization transition. In order to compensate for this drawback, the medium is required to have a very strong perpendicular magnetization orientation property and magnetic anisotropy.

FIG. 5 illustrates a relationship between magnetic fluxes 28 of the conventional ring head 8 and the single layer magnetic film medium 10 having the perpendicular magnetization film 14 of a single layer. Almost all of the magnetic fluxes 28 emerging from the end 18a of the leading pole 18 pass through the perpendicular magnetization film 14 and return to the trailing pole 20. Since the perpendicular magnetization film 14 layered on the substrate 12 is less than 0.1 μm in thickness and is very thin, in order to generate a large magnetic field component in a perpendicular direction in the perpendicular magnetization film 14, it is essentially required to use the ring head 8 whose gap length G1 is set to a very small length. The gap length G1 is, for example, approximately 0.5 μm.

For comparison, a relationship between a conventional magnetic recording head 37 and a two-layer magnetic film perpendicular magnetization medium 30 is illustrated in FIG. 6. The two-layer magnetic film perpendicular magnetization medium 30 includes a non-magnetic substrate 32, a soft magnetic ground film 34 of Ni-Fe or a like material layered on the non-magnetic substrate 32 and a perpendicular magnetization layer 36 made of Co-Cr and layered on the soft magnetic ground film 34. The soft magnetic ground film 34 has a thickness of more than 1 μm, and the perpendicular magnetization layer 36 has a thickness of less than 0.1 μm. Almost all of magnetic fluxes 42 emerging from an end 38a of a main magnetic pole 38 of the magnetic recording head 37 pass through the soft magnetic ground film 34 and return to an auxiliary magnetic pole 40.

In the two-layer magnetic film perpendicular magnetization medium 30, since almost all of the magnetic fluxes 42 pass through the soft magnetic ground film 34 of a large film thickness and return to the auxiliary magnetic pole 40 in this manner, it is easy to apply a steep magnetic field in a perpendicular direction to the perpendicular magnetization layer 36. Consequently, the gap length G2 defined between the end 38a of the main magnetic pole 38 and an end 40a of the auxiliary magnetic pole 40 need not be set to a small length as in the thin film ring head 8 shown in FIG. 5, and the gap length G2 is usually set to a large length of approximately 10 μm.

As apparent from comparison between FIGS. 5 and 6, the ring head 8 whose gap length G1 is very small must be used for the single layer magnetic film medium 10, for the two-layer magnetic film perpendicular magnetization medium 30, the magnetic recording head 37 which has a construction quite different from that of the thin film ring head 8 and has a very large gap length G2 is used. For a recording head for a two-layer magnetic film perpendicular magnetization medium, several recording heads which are constructed such that an auxiliary magnetic pole is spaced from a surface of a medium farther than a main magnetic pole have been proposed (Japanese Patent Laid-Open Application No. Heisei 1-151011 and Japanese Patent Laid-Open Application No. Heisei 4-90101).

However, for the conventional ring head 8 for the single layer magnetic film medium 10, a ring head wherein the distance from the end 18a of the leading pole 18 to the surface of the medium and the distance from the end 20a of the trailing pole 20 to the surface of the medium are equal to each other is used. Where the thin film ring head 8 of such a construction just described is used as a recording head for a single layer magnetic film perpendicular magnetization medium, since a very strong perpendicular magnetic orientation property and perpendicular magnetic anisotropy are required for the medium, it is not easy to manufacture the medium. Where a medium having insufficient magnetic characteristics is used, the recording and/or reproduction characteristic is deteriorated remarkably.

SUMMARY OF THE INVENTION

Accordingly, it is an object of the present invention to provide a recording head for a perpendicular magnetization medium having a single layer magnetic film by which a very steep perpendicular direction component distribution of a recording magnetic field can be obtained.

In accordance with an aspect of the present invention, there is provided a recording head for a magnetic medium having a single layer magnetic film having an axis of easy magnetization in a direction inclined from an in-plane direction of the magnetic medium, comprising a leading pole provided on the upstream side in a direction of movement of the medium and having an end opposing to the medium, a trailing pole having an end cooperating with the end of the leading pole to define a small gap therebetween and opposing to the medium and a rear end portion held in contact with the leading pole, the trailing pole being provided on the downstream side in the direction of movement of the medium, and a coil wound around the contacting portions of the leading pole and the trailing pole, wherein the end of the trailing pole is retracted a predetermined length from the end of the leading pole.

Preferably, the predetermined length is larger than the small gap, and the single layer magnetic film is a perpendicular magnetization film having an axis of easy magnetization in a perpendicular direction to a surface thereof.

In accordance with another aspect of the present invention, there is provided a recording head for a magnetic medium having a single layer magnetic film having an axis of easy magnetization in a direction inclined from an in-plane direction of the magnetic medium, comprising a leading pole provided on the upstream side in a direction of movement of the medium and having an end opposing to the medium, a trailing pole having an end cooperating with the end of the leading pole to define a small gap therebetween and opposing to the medium and a rear end portion held in contact with the leading pole, the trailing pole being provided on the downstream side in the direction of movement of the medium, and a coil wound around the contacting portions of the leading pole and the trailing pole, wherein the end of the leading pole is flush with the end of the trailing pole and the trailing pole has a recessed portion of a predetermined depth formed at the end thereof which opposes to the gap.

According to the present invention, since the recording head is constructed such that the end of the trailing pole is spaced away from the surface of the medium farther than the end of the leading pole, the magnetic field on the leading pole side is applied more strongly on the medium than the magnetic field on the trailing pole side. As a result, in the present invention, since magnetization transition is formed in the magnetic film of the medium by a magnetic field gradient which has a very steep inclination in the gap, the recording head is effective as a recording head for a single layer magnetic film perpendicular magnetization medium having no soft magnetic ground film.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 1:
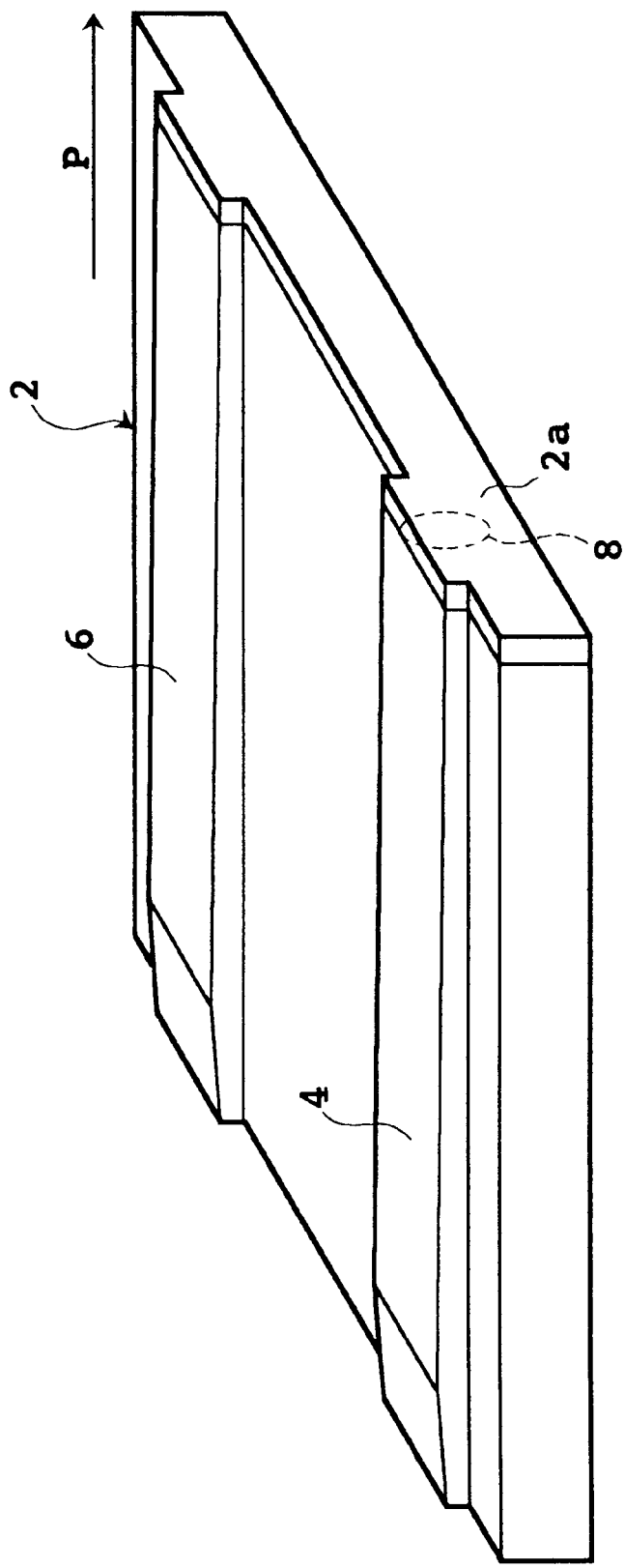
FIG. 1 is a perspective view of a head slider.
Figure 2:
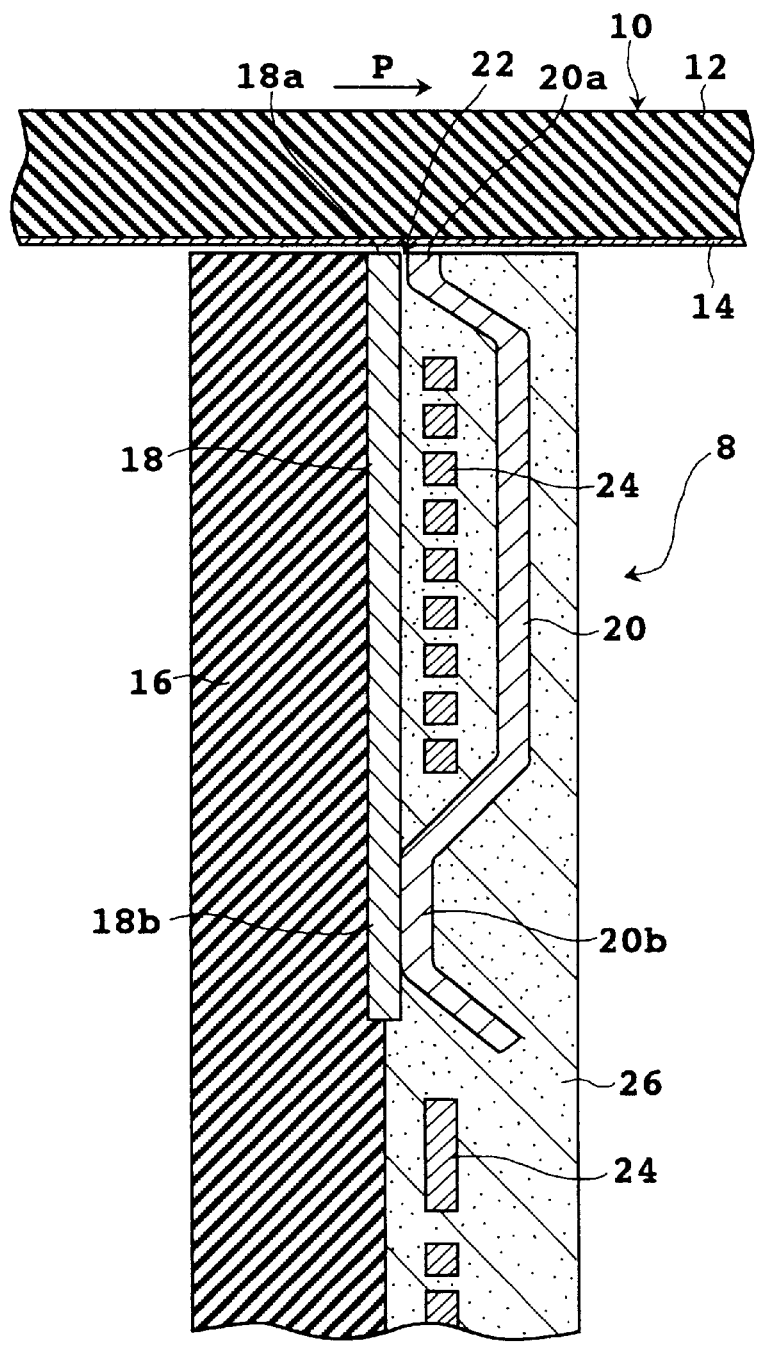
FIG. 2 is a sectional view of a conventional thin film ring head.
Figure 3:
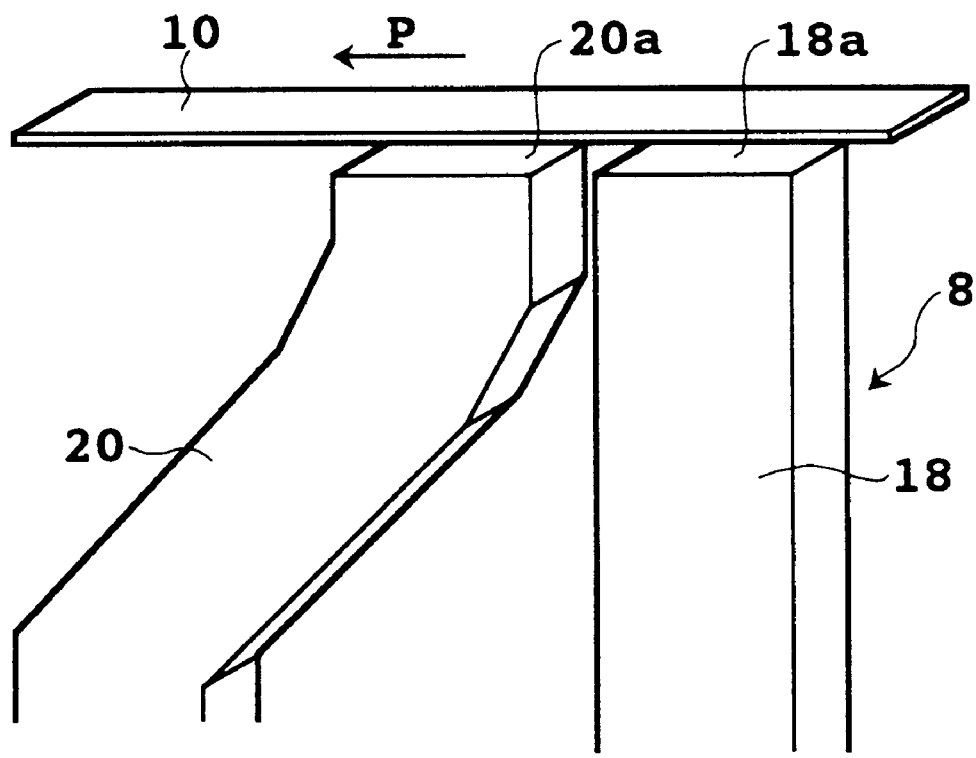
FIG. 3 is an enlarged view of an end portion of the conventional thin film ring head.
Figure 7:
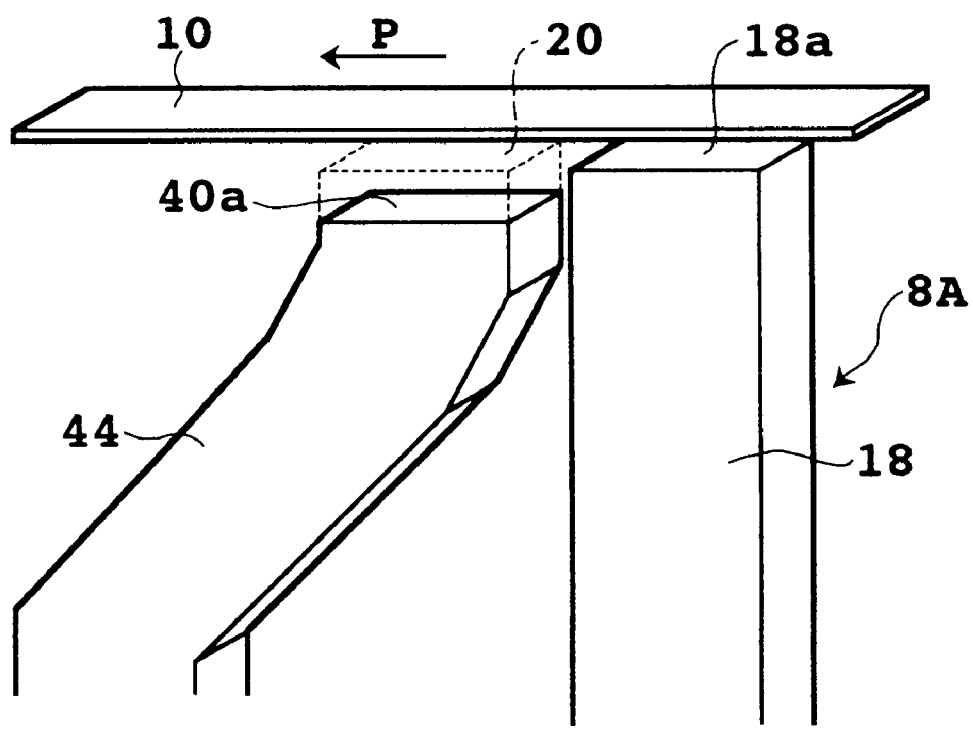
FIG. 7 is a view showing a principle structure of a thin film ring head of the present invention.

A principle of a ring head 8A of the present invention is described first with reference to FIG. 7. The ring head 8A of the present invention is different only in structure of a trailing pole 44 from the conventional ring head 8 shown in FIGS. 2 and 3 but is common in the other construction to the conventional thin film ring head 8, and accordingly, overlapping description of the common construction is omitted herein to avoid redundancy. In the conventional ring head 8, the height of the leading pole 18 and the height of the trailing pole 20 are equal to each other as seen from dotted lines in FIG. 7. In other words, the distances from the surface of a medium 10 to the two poles 18 and 20 are equal to each other.

In contrast, in the present invention, in order to achieve the object described hereinabove, the ring head 8A is characterized in that the height of the trailing pole 44 positioned on the downstream side in the direction of movement of the medium 10 is lower than the height of the leading pole 18 positioned on the upstream side so that the distance between the medium 10 and the end 18a of the leading pole 18 is larger by more than a predetermined length than the distance between the medium 10 and an end 44a of the trailing pole 44. A steep gradient portion of a perpendicular magnetic field distribution produced by this structure is used for writing of data.

Figure 4:
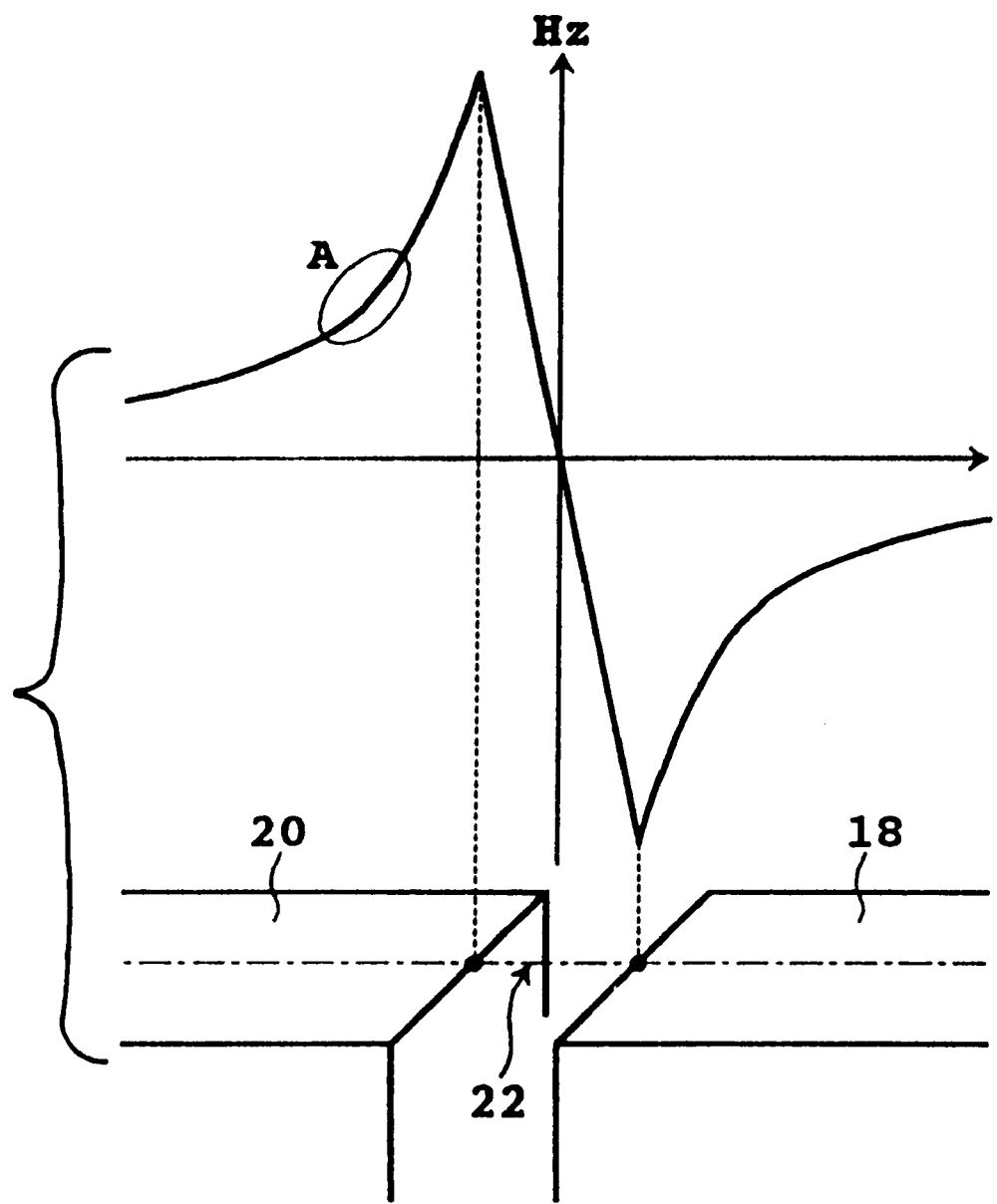
FIG. 4 is a view illustrating a distribution of a perpendicular component of a recording magnetic field by the conventional thin film ring head.
Figure 5:
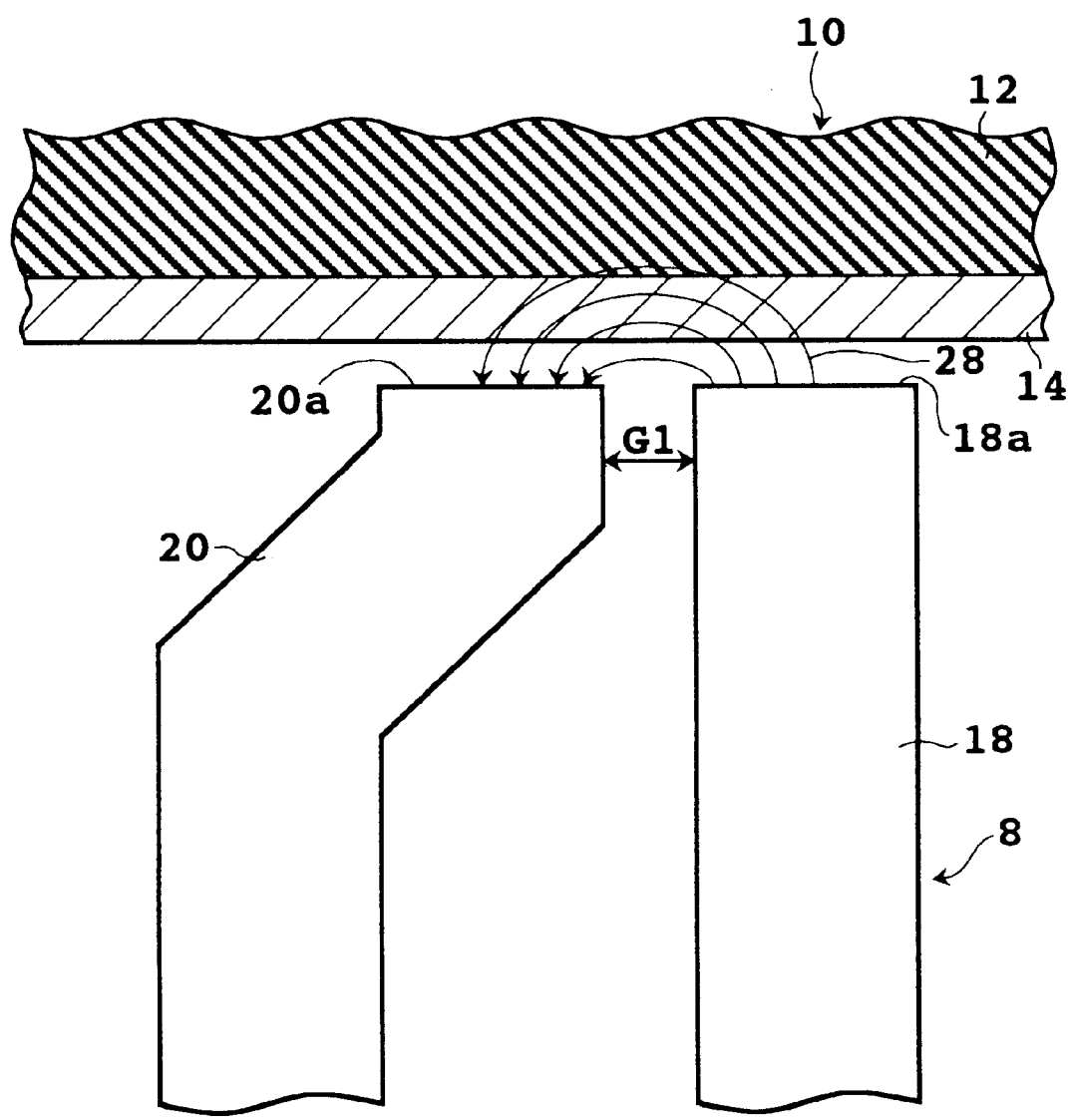
FIG. 5 is a view illustrating a relationship between magnetic fluxes by the conventional thin film ring head and a single layer magnetic film perpendicular magnetization medium.

The distribution of a perpendicular direction component of a recording magnetic field by the conventional ring head 8 has, as seen in FIG. 4, peaks having the different polarities from each other at locations centered at the small gap 22 in the proximity of the edge of the leading pole 18 facing the gap and in the proximity of the edge of the trailing pole 20 similarly facing the gap. In contrast, in the present invention, since, when viewed from the medium 10, the leading pole 18 is positioned at a shorter distance than the trailing pole 44, the magnetic field acting upon the medium is stronger on the leading pole 18 side than on the trailing pole 44 side.

Figure 8:
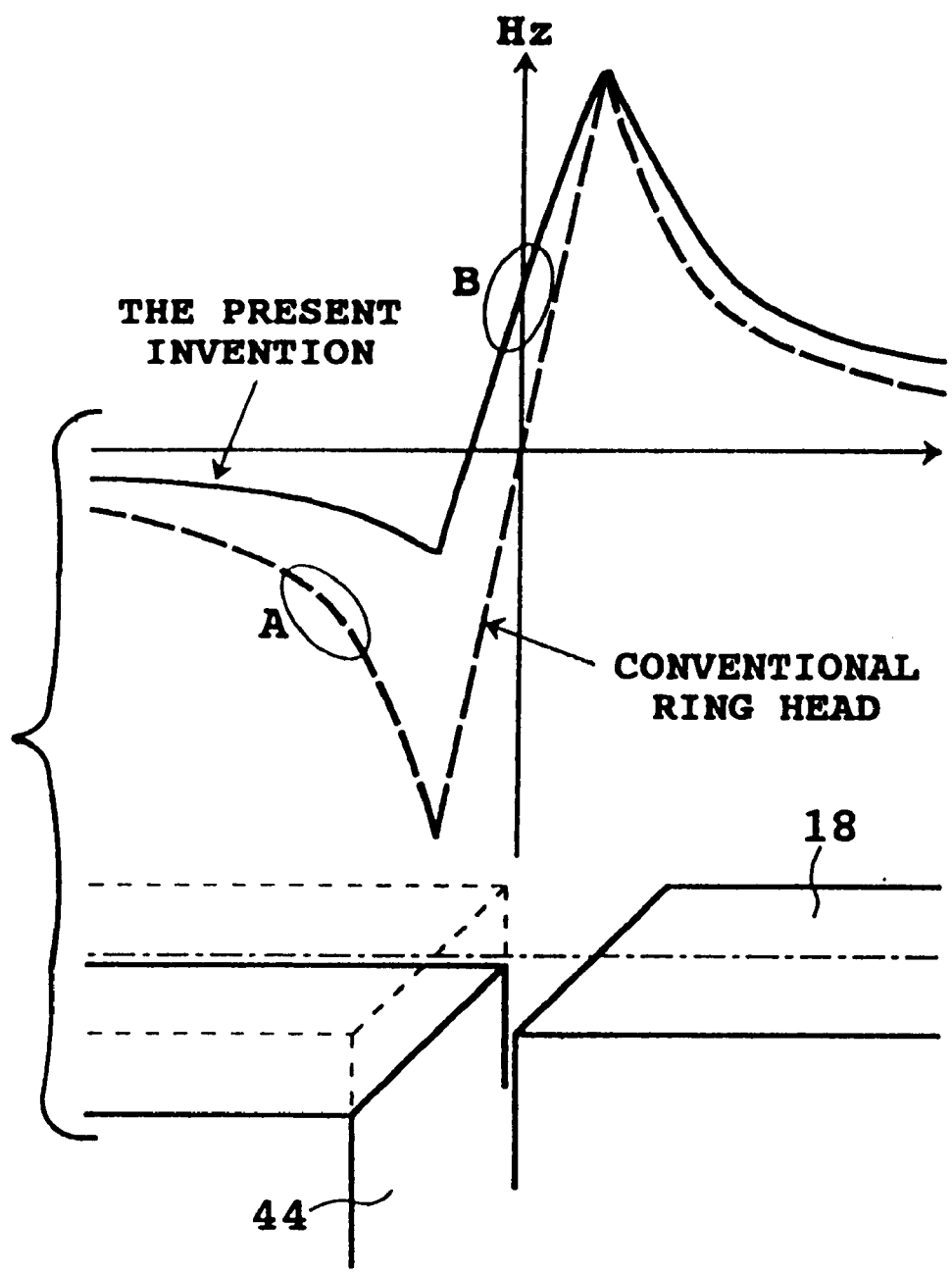
FIG. 8 is a view illustrating a distribution of a perpendicular direction component of a recording magnetic field by the thin film ring head of the present invention.

Referring to FIG. 8, the distribution of the perpendicular magnetic field component Hz of the conventional ring head 8 is indicated by a broken line with the polarity thereof reversed from that of FIG. 4. In contrast, since the perpendicular magnetic field component Hz by the ring head 8A of the present invention provides a magnetic field which is weaker on the trailing side from the reason described above, such a distribution as indicated by a solid line is obtained. Since the ring head 8A has such a perpendicular magnetic field component distribution as just described, if the peak magnetic field on the trailing pole 44 side is reduced to a value in strength which is lower than the coercive force of the medium, then the medium magnetized by the magnetic field on the leading pole 18 side is not re-written by the magnetic field on the trailing pole 44 side any more.

Accordingly, the magnetization transition, which is formed, in the conventional thin film ring head 8, by the magnetic field gradient at the portion A on the downstream side of the peak of the trailing pole side, is formed, in the ring head 8A, by the magnetic field gradient at a portion B in the gap. Since the magnetic field gradient at the portion B has a very steep gradient comparing with the magnetic field gradient at the portion A, by using the steep gradient portion B of the perpendicular magnetic field component, a superior recording head for a perpendicular magnetization medium having a single layer magnetic film can be provided.

A conventional in-plane magnetic recording system wherein a trailing pole of a thin film ring head is recessed has been reported (G. E. Roberts, T. A. Roscamp and P. D. Frank, "Origins of Playback Asymmetry in Recording with Thin Film Disk Heads", IEEE Trans. on Magn., Vol. MAG-17, No. 6, 1981). In this report, however, the recording system is limited to the in-plane magnetic recording system, and besides, only application of the thin film ring head to reproduction is described. Thus, it is apparent that the report does not present the idea that a perpendicular component distribution of a head magnetic field is utilized for writing of a perpendicular magnetization medium.

Figure 6:
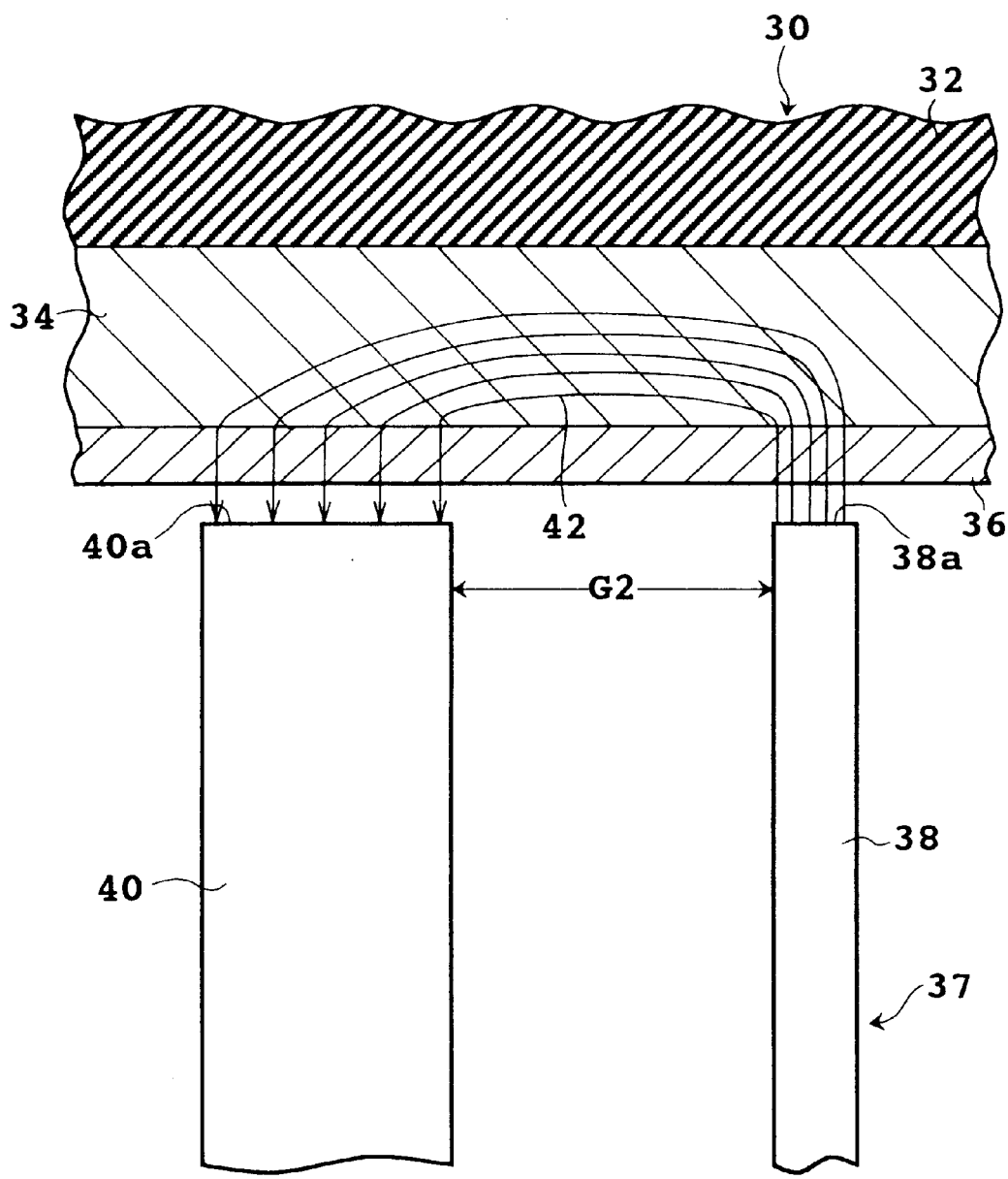
FIG. 6 is a view illustrating a relationship between magnetic fluxes by a conventional recording head and a two-layer magnetic film perpendicular magnetization medium.

Meanwhile, as a magnetic head for a two-layer film perpendicular magnetization medium having a soft magnetic ground film between a perpendicular magnetization film and a substrate as described above, a magnetic head is known wherein an auxiliary magnetic pole is spaced away from a recording medium farther than a main magnetic pole. However, with the two-layer film perpendicular magnetization medium, a magnetic field is applied normally in a perpendicular direction to the perpendicular magnetization layer 36 as seen in FIG. 6. This similarly applies also to a case wherein the auxiliary magnetic pole 40 is spaced away from the medium 30 farther than the main magnetic pole 38.

Consequently, in the magnetic head for a two-layer film perpendicular magnetization medium, the reason why the auxiliary magnetic pole 40 is spaced away from the medium surface farther than the main magnetic pole 38 is that it is intended to make the magnetic field from the auxiliary magnetic pole 40 weak to reduce magnetic noise, and the technical idea that a magnetic field gradient portion having a steep gradient is utilized for writing of data, which is a characteristic of the present invention, is not disclosed in any of the prior art documents at all.

Figure 9A:
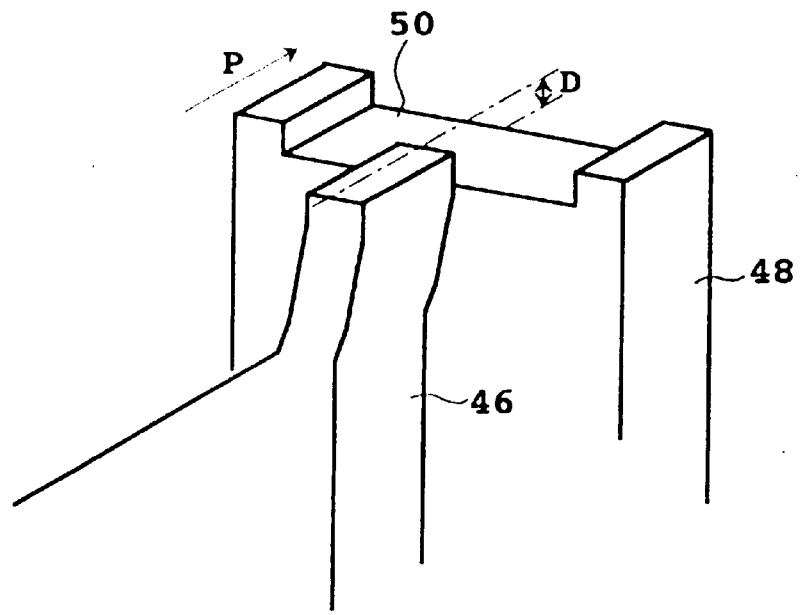
FIG. 9A is a view showing an end portion of a thin film ring head of a first embodiment of the present invention.

FIG. 9A is a partial enlarged view of a first embodiment of the present invention and shows a portion in the proximity of an end of a thin film ring head wherein an end (surface opposing to a medium) of a trailing pole 48 is partially removed by trimming to form a recessed portion 50. Reference numeral 46 denotes a leading pole, and an arrow mark P indicates a direction of movement of a medium. In the present embodiment, the widths of the leading pole 46 and the trailing pole 48 in the medium movement direction (down track direction) are 3.5 $\mu$m; the gap length is 0.5 $\mu$m; the width of the leading pole 46 in the cross track direction is 3.0 $\mu$m; the recessed depth D of the trailing pole 48 by trimming is 1.0 $\mu$m; and the width of the recessed portion 50 is 10.0 $\mu$m.

Figure 9B:
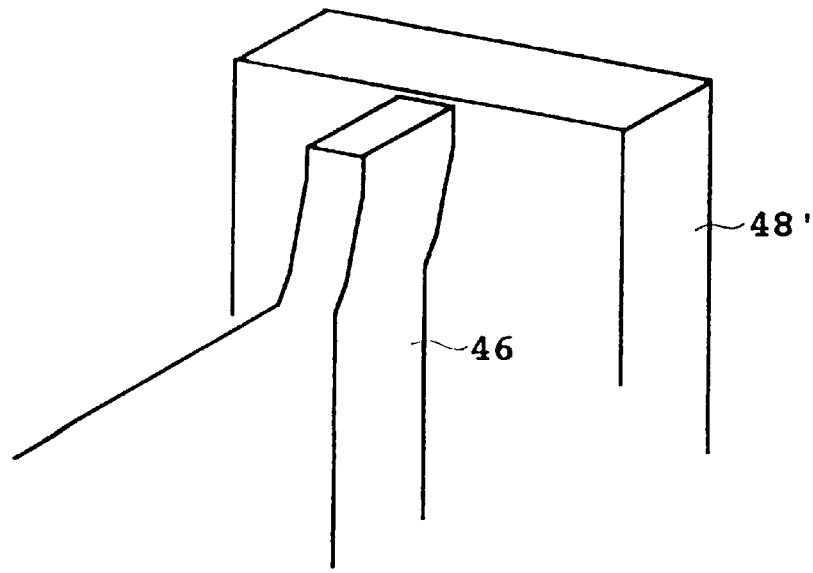
FIG. 9B is a view showing a conventional example which does not have a recessed portion at an end of a trailing pole.
Figure 10:
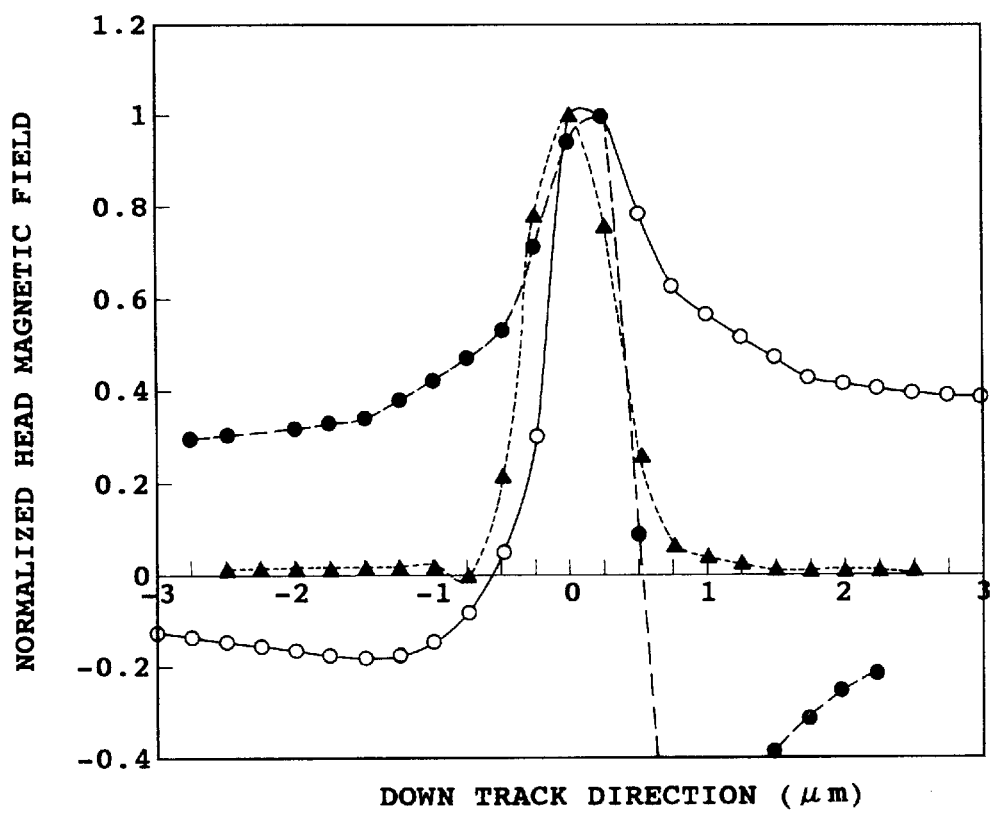
FIG. 10 is a diagram illustrating an example of three-dimensional numerical value calculation of a head magnetic field perpendicular component at the position of a medium.

For comparison, a conventional ring head for which no trimming has been performed, that is, wherein the trailing pole 48' does not have a recessed portion at a medium opposing surface thereof, is shown in FIG. 9B. A result of three-dimensional numerical value calculation of a head magnetic field perpendicular component at the position of the medium conducted for the two recording heads shown in FIGS. 9A and 9B, is illustrated in FIG. 10. Blank circles interconnected by a solid line indicate a recording magnetic field distribution to the perpendicular magnetization medium of the present invention, and solid circles interconnected by a broken line indicate a recording magnetic field distribution of the conventional head. Further, for reference, a recording magnetic field distribution to an in-plane magnetization medium of the conventional ring head is indicated by a dotted line. The axis of abscissa represents the distance in the medium movement direction (down track direction), and the axis of ordinate indicates the normalized recording head magnetic field.

From FIG. 10, it can be seen that the recording magnetic field gradient of the conventional ring head is very moderate and a magnetic field strength of 50% or more of a peak magnetic field is kept even at a position spaced by 0.5 µm from the peak position to the trailing side (left side in FIG. 10). In contrast, with the recording magnetic field of the head of the present invention, the magnetic field strength is approximately 0 even at a distance of 0.5 µm from the peak position to the trailing side. This is a very steep magnetic field gradient which is substantially equal to the in-plane recording magnetic field component distribution of the conventional ring head indicated by the dotted line.

While the perpendicular magnetic field component distribution according to the present invention has a very steep magnetic field gradient in this manner, the principle of the present invention can be applied also to a magnetic field component distribution which is not in a fully perpendicular direction. In particular, supposing an axis of easy magnetization inclined a little toward the in-plane direction from a direction perpendicular to the surface of the film, if the inclination of the axis of easy magnetization is within approximately 30 degrees from the perpendicular direction, a magnetic field gradient steeper than that of an oblique direction magnetic field component distribution of the conventional ring head is obtained also from the distribution of the writing magnetic field component in the oblique axis direction. Accordingly, the present invention can be applied to a recording head for an oblique magnetization medium having an axis of easy magnetization which is not fully perpendicular but oblique to the surface of the film.

While, in the first embodiment described above, the depth of the recessed portion 50 formed on the trailing pole 48 is set to 1.0 µm, the effect of the present invention can be achieved if the end of the trailing pole 48 is recessed from the height of the end face (medium opposing face) of the leading pole 46 by an amount more than a length corresponding to the gap length between the leading pole 46 and the trailing pole 48.

Figure 11:
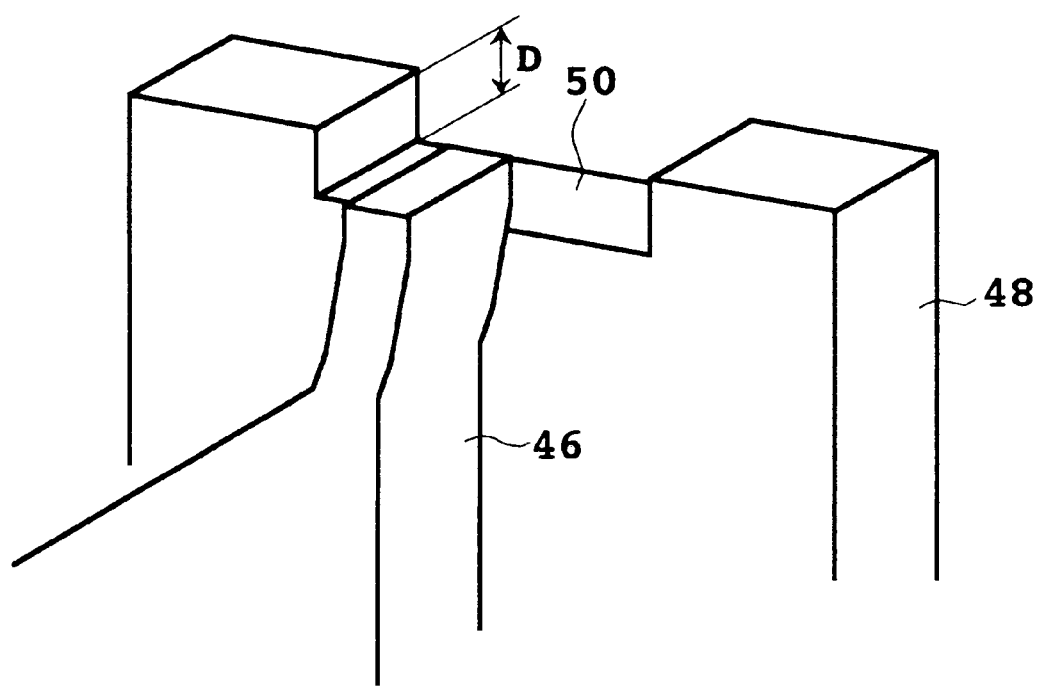
FIG. 11 is a diagrammatic view illustrating a trailing pole recessed depth dependency.
Figure 12:
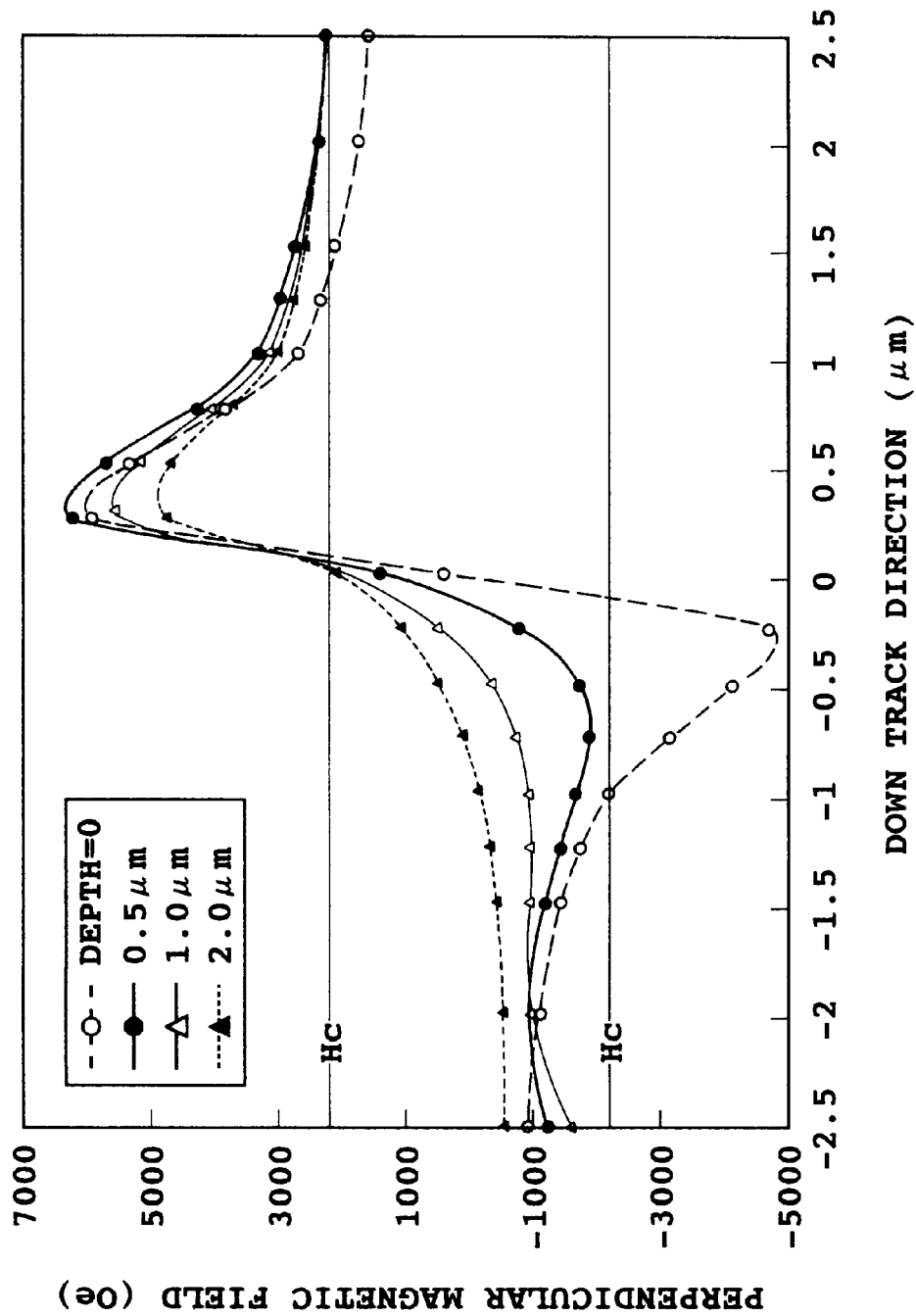
FIG. 12 is a graph illustrating a trailing pole recess depth dependency of a perpendicular magnetic field distribution.

In the following, a trailing pole recess depth dependency of the perpendicular magnetic field distribution is described with reference to FIGS. 11 and 12. The graph of FIG. 12 plots a recording magnetic field perpendicular component of such a recording head model as shown in FIG. 11 when the depth D of the recessed portion 50 is changed to 0.5, 1.0 and 2.0 µm from the instance wherein the trailing pole 48 does not have a recessed portion (depth=0). FIG. 12 illustrates an example of measurement where the length of the recessed portion 50 of the trailing pole 48 in the down track direction is 3.5 µm; the width in the cross track direction is 10 µm; the width of the leading pole 46 is 3 µm; and the gap length between the leading pole 46 and the trailing pole 48 is 0.5 µm.

If the coercive force of a recording medium in a perpendicular direction is assumed to be Hc=2,200 Oe, where the trailing pole 48 does not have the recessed portion 50, the negative peak exceeds the coercive force Hc, and consequently, magnetization transition is formed by a magnetic field gradient portion on the trailing side (left side in FIG. 12) with respect to the negative peak. On the other hand, if the end of the trailing pole 48 is recessed by 0.5 µm or more, the negative peak does not exceed the medium coercive force Hc any more. Accordingly, since magnetization transition is determined by a steep magnetic field gradient portion between the two positive and negative peaks, the head can be used as a superior recording head for a single layer film perpendicular magnetization medium.

Figure 13:
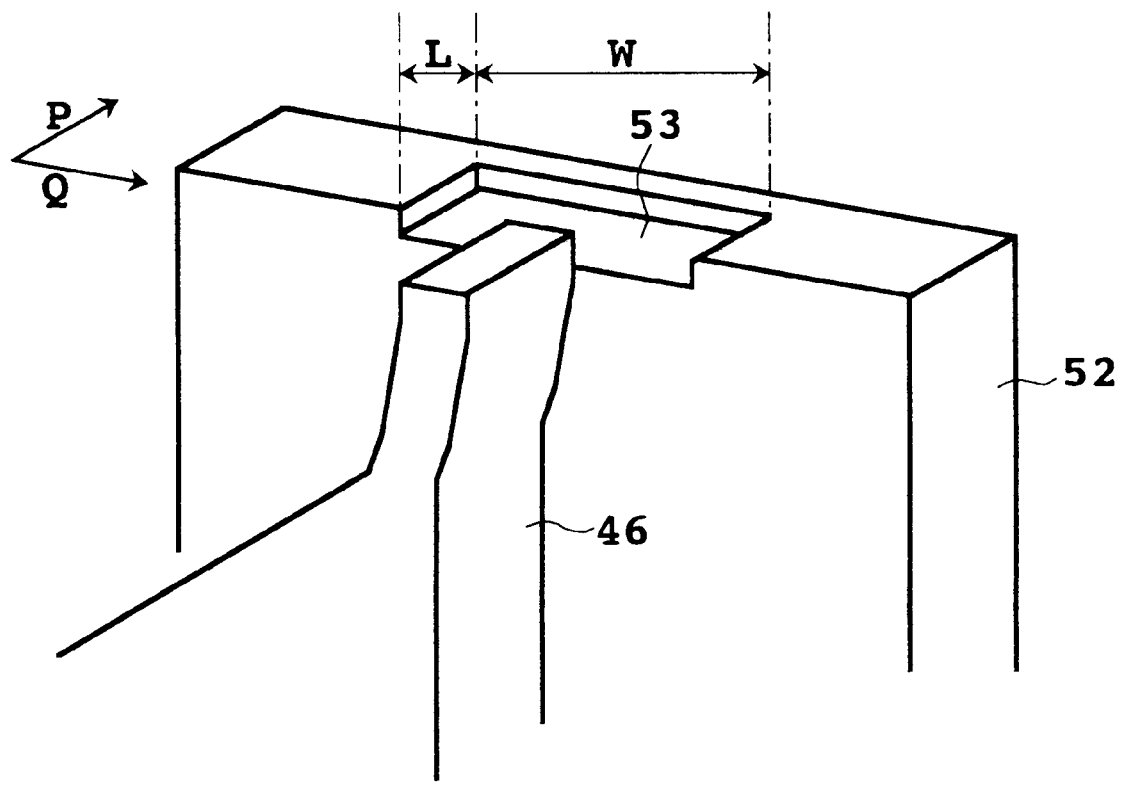
FIG. 13 is a view illustrating a down track direction length of a trailing pole recess region and a cross track direction width dependency.
Figure 14:
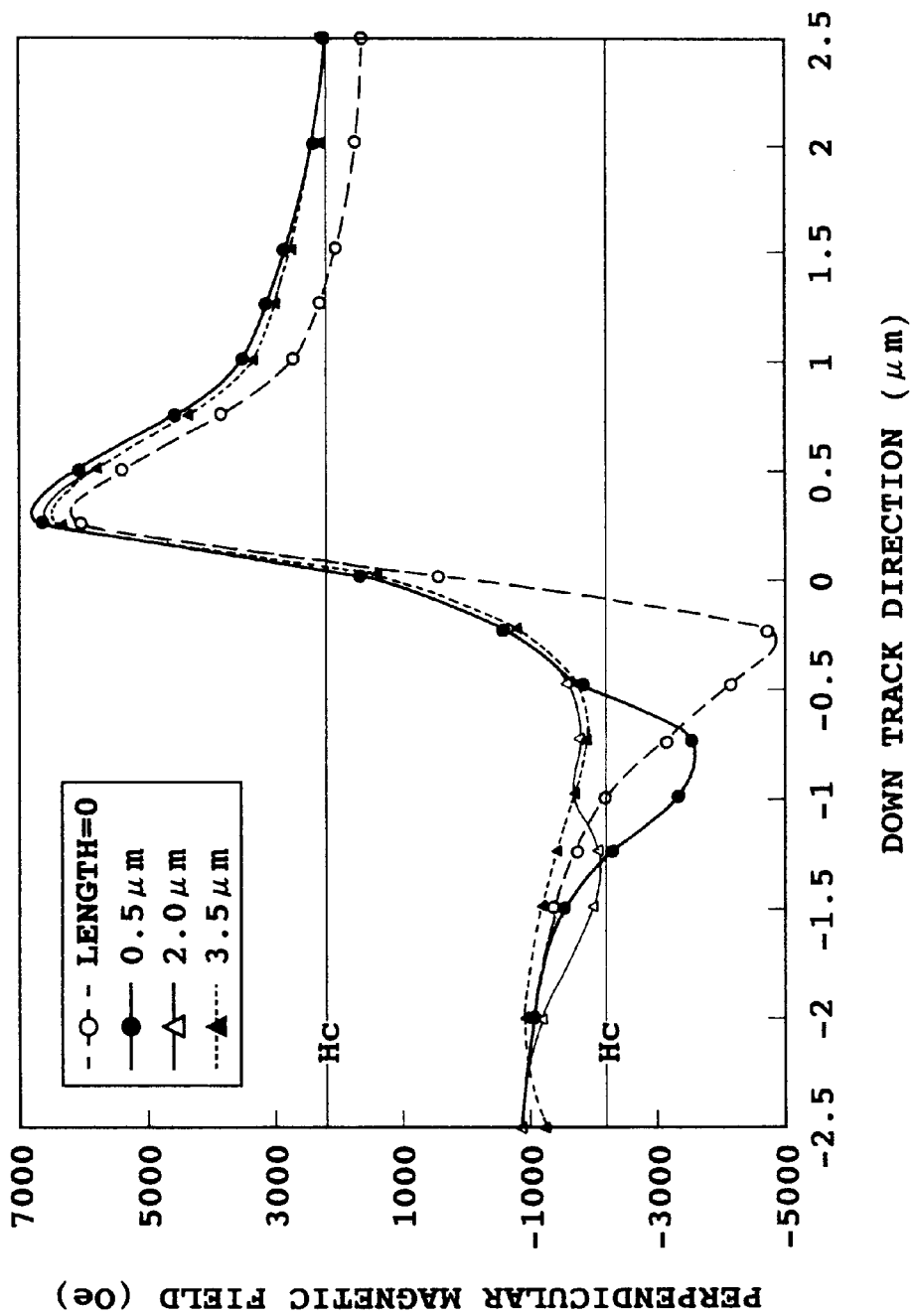
FIG. 14 is a graph illustrating a recess region down track direction length dependency of a perpendicular magnetic field distribution.

FIG. 13 is a view illustrating the length in the down track direction and a cross track direction width dependency of a recess region (recessed portion) 53 of a trailing pole 52. An arrow mark P indicates the down track direction, and another arrow mark Q indicates the cross track direction. FIG. 14 plots the perpendicular recording magnetic field distribution of the recording head shown in FIG. 13 when the down track direction length L of the recessed portion 53 is changed to 0.5, 1.0, 2.0 and 3.5 µm from the instance wherein the trailing pole 52 does not have the recessed portion 53 (L=0). From FIG. 14, it can be seen that the negative perpendicular magnetic field peak does not exceed the medium coercive force Hc any more where the length L of the recessed portion 53 is 2.0 µm or more.

The graph of FIG. 14 illustrates an example of measurement where the depth of the recessed portion 53 of the trailing pole 52 is 0.5 µm; the width in the cross track direction is 10 µm; the width of the leading pole 46 is 3 µm; and the gap length between the leading pole 46 and the trailing pole 52 is 0.5 µm. While it is indicated that, where the depth and the width W of the trailing pole 52 are set to fixed values like the requirement indicated in FIG. 14, the length L of the recessed portion 53 is required to be 2.0 µm or more, since the extent of the magnetic field produced from the head depends very much upon the gap length, if the gap length is reduced to 0.25 µm which is ½ that mentioned above, also the length L of the recessed portion 53 is sufficient if it is approximately 1.0 µm. Accordingly, in order to achieve the effect of the present invention, the length L of the recessed portion 53 of the trailing pole 52 in the down track direction is required to be four times or more the gap length.

While, in the measurement example indicated in FIG. 14, the width W of the recess region 53 of the trailing pole 52 in the cross track direction is set to the fixed value of 10.0 µm, it is sufficient if the trailing pole 52 is recessed, as viewed from the end edge portion of the leading pole 46, by an equal length in both of the cross track direction and the down track direction. Accordingly, in order to attain the effect of the present invention, the width W of the recess region 53 of the trailing pole 52 in the cross track direction is required to be larger than a sum of the width of the leading pole 46 and eight times the gap length.

Figure 15:
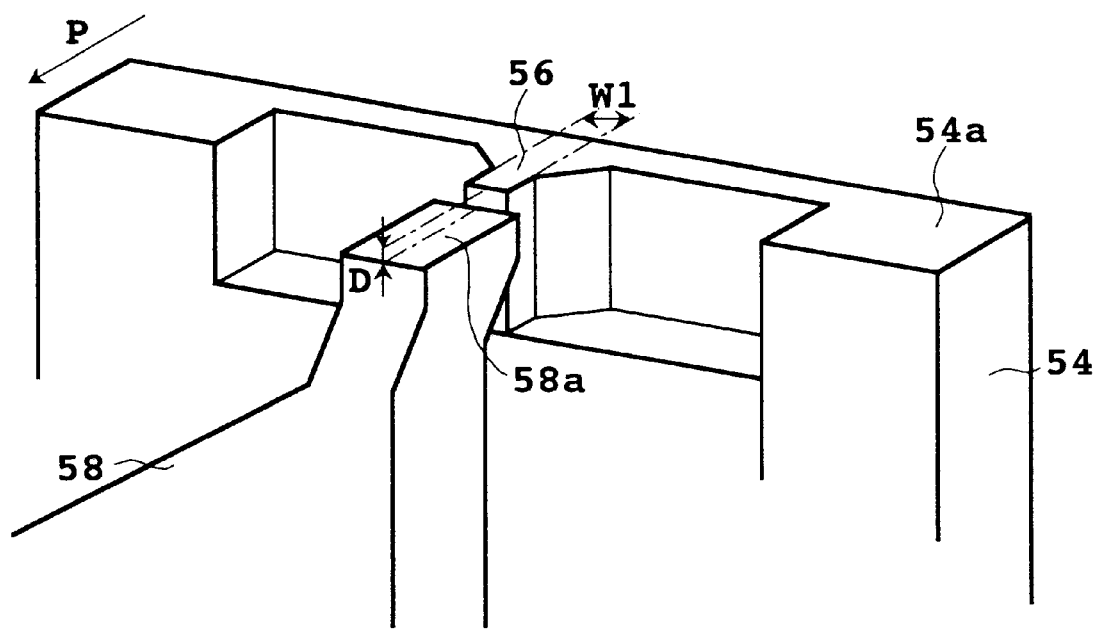
FIG. 15 is a perspective view showing an end portion of a thin film ring head of a second embodiment of the present invention.

FIG. 15 shows a perspective view of an end portion of a head of a second embodiment of the present invention. The present embodiment shows a case wherein the width of a leading pole 54 in the cross track direction is larger than the width of a trailing pole 58. In the present embodiment, an end 54a of the leading pole 54 is worked so that a projection 56 with which the effective pole width Wl becomes equal to or smaller than the trailing pole width is formed at the end portion of the leading pole 54.

In the embodiment of FIG. 15, an end 58a of the trailing pole 58 is recessed by a depth D=0.75 µm from the end 54a of the leading pole 54, and the width of the end 58a of the trailing pole 58 in the cross track direction is 4 µm. Further, the width of the projection 56 of the leading pole 54 in the cross track direction is 3 µm, and the gap length between the leading pole 54 and the trailing pole 58 is 0.5 µm.

Figure 16:
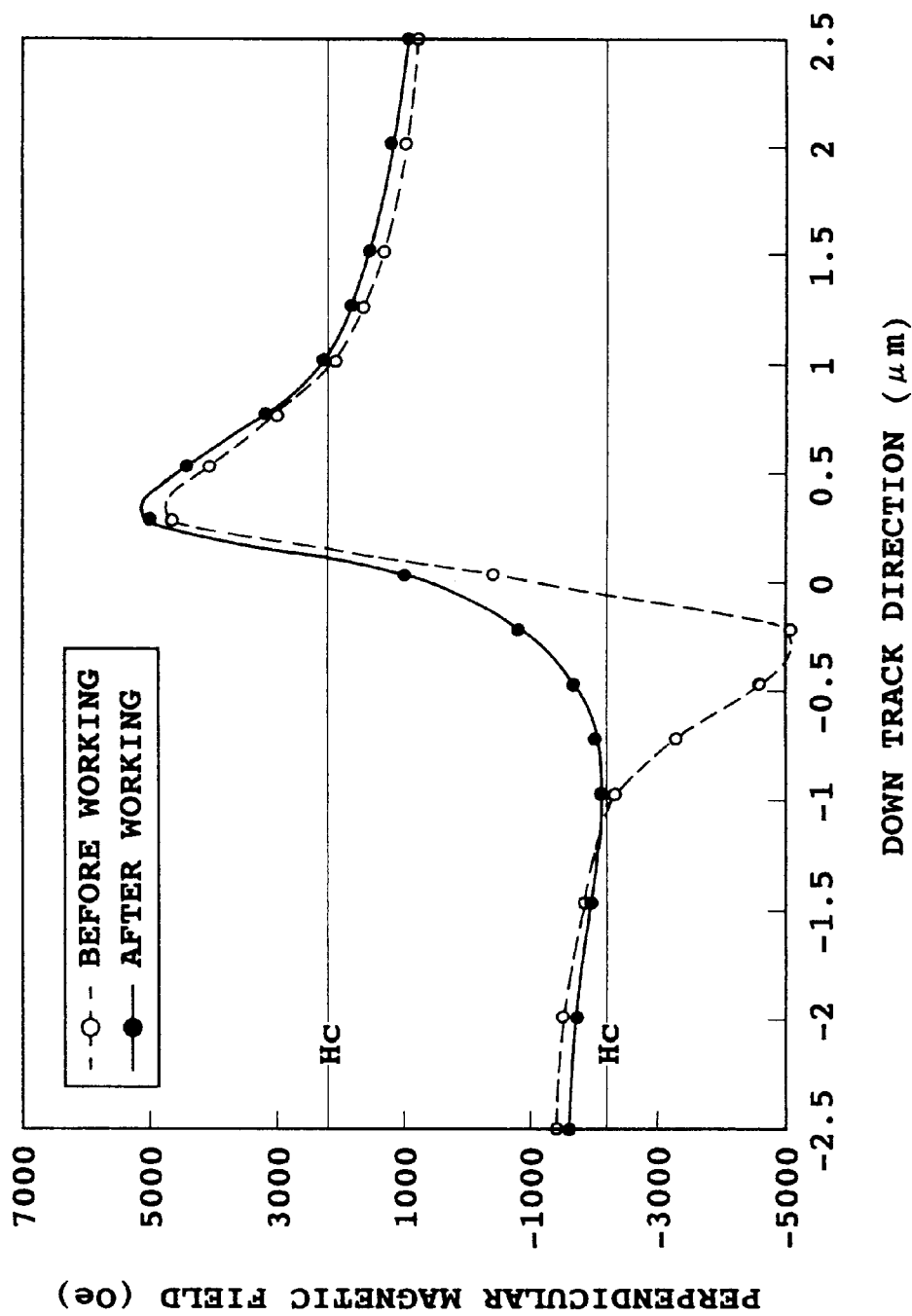
FIG. 16 is a graph illustrating a variation between head magnetic field distributions before and after working of an end of a leading pole.

FIG. 16 illustrates a variation between head magnetic field distributions before and after working of the end of the leading pole 54. As apparently seen from FIG. 16, the head magnetic field distribution after working of the end of the leading pole 54 indicated by a solid line curve exhibits that the peak of the perpendicular magnetic field in the negative does not exceed the medium coercive force Hc any more, and consequently, the effect of the present invention can be achieved. Further, the effect of the present invention can be achieved also by using a thin film ring head, a ferrite head or a MIG head wherein the leading pole width and the trailing pole width are equal to each other as a base head and working an end of a pole suitably.

As described above, according to the present invention, a very sharp perpendicular direction magnetic field component distribution of a recording magnetic field can be obtained. Accordingly, a superior recording head for a single layer film perpendicular magnetization medium which does not have a soft magnetic ground layer can be provided. Further, since the present invention can be put into practice simply only by partially working an end portion of a trailing pole using a conventional thin film ring head or a like head as a base, it is very advantageous also in terms of production and contributes very much to improvement in performance of a perpendicular magnetic recording apparatus.

What is claimed is:

1. A recording head in combination with a magnetic medium having a single layer magnetic film having an axis of easy magnetization in a direction inclined from an in-plane direction of the magnetic medium, said recording head comprising:

a leading pole provided on an upstream side relative to a direction of movement of the medium and having an end opposing to the medium;

a trailing pole having an end cooperating with said end of said leading pole to define a small gap therebetween and a rear end portion held in contact with said leading pole, said trailing pole being provided on a downstream side relative to the direction of movement of the medium; and a coil wound around contacting portions of said leading pole and said trailing pole;

wherein said end of said trailing pole is retracted a predetermined length from said end of said leading pole;

wherein a magnetic field gradient portion having a steep gradient is utilized for writing of data.

2. A recording head according to claim 1, wherein said predetermined length is larger than a length of said small gap.

3. A recording head according to claim 1, wherein said single layer magnetic film is a perpendicular magnetization film having an axis of easy magnetization in a perpendicular direction to a surface thereof.

4. A recording head according to claim 1, wherein said leading pole has a larger width in a direction perpendicular to the direction of movement of the medium than that of said trailing pole, and said leading pole having a projection configured so that a width of said leading pole end is equal to or smaller than a width of said trailing pole.

5. A recording head in combination with a magnetic medium having a single layer magnetic film having an axis of easy magnetization in a direction inclined from an in-plane direction of the magnetic medium, said recording head comprising:

a leading pole provided on an upstream side relative to a direction of movement of the medium and having an end opposing to the medium;

a trailing pole having an end cooperating with said end of said leading pole to define a small gap therebetween and a rear end portion held in contact with said leading pole, said trailing pole being provided on a downstream side relative to the direction of movement of the medium; and a coil wound around contacting portions of said leading pole and said trailing pole;

wherein said end of said leading pole is flush with said end of said trailing pole and said trailing pole has a recessed portion of a predetermined depth formed at said end thereof which opposes to said gap whereby a magnetic field acting on the medium is stronger on said leading pole than on trailing pole.

6. A recording head according to claim 5, wherein the predetermined depth is larger than the length of said small gap.

7. A recording head according to claim 5, wherein the length of said recessed portion in the direction of movement of the medium is larger than four times the length of said small gap.

8. A recording head according to claim 5, wherein said trailing pole has a larger width in a direction perpendicular to the direction of movement of the medium than a width of said leading pole, and the width of said recessed portion in the direction perpendicular to the direction of movement of the medium is larger than a sum length of the width of said end of said leading pole and eight times the length of said small gap.

9. A recording head according to claim 5, wherein said single layer magnetic film is a perpendicular magnetization film having an axis of easy magnetization in a direction perpendicular to a surface thereof.

* * * * *

UNITED STATES PATENT AND TRADEMARK OFFICE
CERTIFICATE OF CORRECTION

PATENT NO. : 5,920,449
DATED : July 6, 1999
INVENTOR(S) : Ikuya Tagawa

It is certified that error appears in the above-indentified patent and that said Letters Patent is hereby corrected as shown below:

Column 1, line 17, after "results" insert --in--.

Column 2, line 7, change "a" to --an--.

Column 2, line 18, after "point" insert --of--.

Column 2, line 30, after "adjacent" insert --to--.

Column 2, line 64, after "of" insert --the--.

Signed and Sealed this

Second Day of November, 1999

*Attest:*

Q. TODD DICKINSON

*Attesting Officer*     Acting Commissioner of Patents and Trademarks